US008584699B1

(12) United States Patent
Carver

(10) Patent No.: US 8,584,699 B1
(45) Date of Patent: Nov. 19, 2013

(54) COMPENSATING PRESSURE REGULATOR

(76) Inventor: Jared Carver, South Hadley, MA (US)

( * ) Notice: Subject to any disclaimer, the term of this patent is extended or adjusted under 35 U.S.C. 154(b) by 322 days.

(21) Appl. No.: 12/660,208

(22) Filed: Feb. 23, 2010

Related U.S. Application Data

(60) Provisional application No. 61/208,731, filed on Feb. 27, 2009.

(51) Int. Cl.
*F16K 31/12* (2006.01)
(52) U.S. Cl.
USPC .................................. 137/505.18; 137/505.42
(58) Field of Classification Search
USPC .............. 137/505.18, 505.41, 505.42, 505.21
See application file for complete search history.

(56) References Cited

U.S. PATENT DOCUMENTS

| 3,095,897 | A | * | 7/1963 | Pennstrom | 137/454.2 |
|---|---|---|---|---|---|
| 5,234,026 | A | * | 8/1993 | Patterson | 137/505.18 |
| 5,595,209 | A | * | 1/1997 | Atkinson et al. | 137/116.5 |
| 5,860,447 | A | | 1/1999 | Chu | |
| 6,161,573 | A | * | 12/2000 | Sheng | 137/505.41 |
| 6,170,519 | B1 | * | 1/2001 | Carroll et al. | 137/505.42 |
| 6,328,054 | B1 | * | 12/2001 | Martin et al. | 137/15.17 |
| 6,637,450 | B2 | * | 10/2003 | Huang | 137/68.3 |
| 7,325,397 | B2 | | 2/2008 | Lee | |
| 2004/0182445 | A1 | * | 9/2004 | Gerasimov | 137/505.18 |
| 2008/0047619 | A1 | * | 2/2008 | Pechtold | 137/505.41 |

* cited by examiner

*Primary Examiner* — Craig Schneider
*Assistant Examiner* — Jessica Cahill
(74) *Attorney, Agent, or Firm* — Stan Collier, Esq.

(57) ABSTRACT

A compensating pressure regulator comprising a single stage regulating device for controlling the flow of compressed gas therethrough; and a compensating device for automatically adjusting transient pressure conditions to provide a substantially uniform gas pressure output by use of a pin like-piston having dual sources of pressure thereon. The compensating pressure regulator for use with bottled gas on portable tools.

3 Claims, 3 Drawing Sheets

COMPENSATING PRESSURE REGULATOR

CROSS REFERENCES TO RELATED APPLICATIONS

This is the regular utility application as filed from U.S. Provisional Patent Application Ser. No. 61/208,731 filed Feb. 27, 2009 by the same inventor, and claims priority to such.

REFERENCE TO FEDERALLY SPONSORED RESEARCH OR DEVELOPMENT

NA

REFERENCE TO JOINT RESEARCH AGREEMENTS

NA

REFERENCE TO SEQUENCE LISTING

NA

BACKGROUND OF THE INVENTION

1. Field of the Invention

The present invention relates generally to pneumatic tools, and, particularly, relates to portable pneumatic tools, and, in greater particularly, relates to devices for controlling the flow of gas thereto.

2. Description of the Prior Art

With the advancement of technology in the construction industry, the use of powered portable devices has become more common. Typically, such devices were powered by an electric generator which converted the AC to DC power as needed or ran a compressor. The powered devices were connected by long electrical cords or air hoses to these devices. The disadvantages are clearly evident such as safety from tripping over cords and hoses, limited range, limited number of operating devices, and the need to transport heavy generators and compressors to construction sites. The next generation of portable powered devices use compact batteries and bottled compressed gas. In regards to portable powered devices using compressed gas, stepping down the gas pressure requires the use of complex pressure regulators.

In particular, pressure regulators are commonly used in the construction trades to regulate the pressure received by pneumatic tools from compressors or other pressure sources. These tools have an optimum range of operation for the pressurized fluid stream which provides them energy to operate. However, most compressors and other conventionally used pressurized fluid stream sources operate at fluid pressures well above the optimum range required by the tool connected to them.

Common power tools such as pneumatic air hammers which drive nails into wood, pneumatic staplers, and pneumatic saws used in construction, and in other applications such as dental offices, require a constant regulated fluid stream to operate effectively. Currently such a regulated pressurized fluid stream is maintained by a fluid pressure regulator located between the conventional pressurized fluid source and the connected tool.

Once such regulator is disclosed by U.S. Pat. No. 5,860,447 that is a single stage pressure regulator with a bleed piston cooperatively engaged thereto. In the normal state of operations, the output pressure pushes the regulator piston against the bleed piston. When the source of pressure is removed from the regulator, the bleed piston is forced to open the seal and this allows the compressed gas in the tool to flow through the regulator piston, and out through bleed vents and thus "de-energizing" the pressure operated tool to prevent accidental operation.

Another regulator of pressurized gas is disclosed by U.S. Pat. No. 7,325,397 that is particularly directed at providing power to nail guns. Because of the high pressure in the carbon dioxide container, a two stage regulator is used. The first regulator reduces substantially the pressure to just above a desired amount. A fine pressure adjustment unit is connected down line from the first regulator and is used to bring the operating pressure into the range to be used by the pneumatic tool such as a nail gun. Neither of the patents are concerned with the occurrence of pressure spikes, high or low, in the input stream.

Accordingly, there is an established need for a compensating pressure regulator having means for eliminating transient spikes.

SUMMARY OF THE INVENTION

The present invention is generally directed at construction and automotive tools requiring a pressurized source of gas to operate.

The present invention further provides means for controlling the flow of the pressurized gas to the construction tool.

In the present invention, the compensating pressure regulator has an output fitting attached to the output side of the pressure regulator. The input side of the pressure regulator is attached to the output of a bottle of compressed gas via threaded connection. The pressure regulator provides directly an operable range of gas pressure to conventional pneumatic tools such as nail guns and wrenches. Additional adjustment to the pressure may be had by an adjustment means located on top of the regulator. The regulator further comprises a single stage regulating device for controlling the flow of compressed gas therethrough; and a compensating device for automatically adjusting transient pressure conditions to provide a substantially uniform gas pressure output. The compensating device includes a double acting pin like-piston that has the input pressure on one side and the output pressure on the other side receiving the appropriate pressure by a channel connecting n pressure output chamber to a lower pressure chamber.

An embodiment of the present invention is to provide a source of compressed gas in a controlled manner to a pressure-operated tool.

Another embodiment of the present invention is to provide a compensating pressure regulator for controlling the output of gas to the pressure operated tool.

A further embodiment of the present invention is to provide a compensating pressure regulator that substantially reduces pressure spikes, high or low, to the pressure operated tool.

A further embodiment of the present invention to provide a compensating pressure regulator that uses a single stage to reduce the input pressure from the bottle of compressed gas to an operating pressure.

Yet a further embodiment of the present invention is to provide a compensating pressure regulator that is of simple design and is easily manufactured.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

The present invention is directed at a pressure regulator for use on portable tools using a portable source of compressed gas.

It should be understood that the present invention is not limited to use on portable compressed gas cylinders, but may be used on any source of pressurized gas or fluids to reduce or substantially eliminate pressure transient conditions such as spikes, either high pressure or low pressure, and is not limited to the use on construction tools, but other devices that require substantially uniform operating pressures. Any and all cited references are incorporated by reference hereto as to their teachings.

Figure 1:
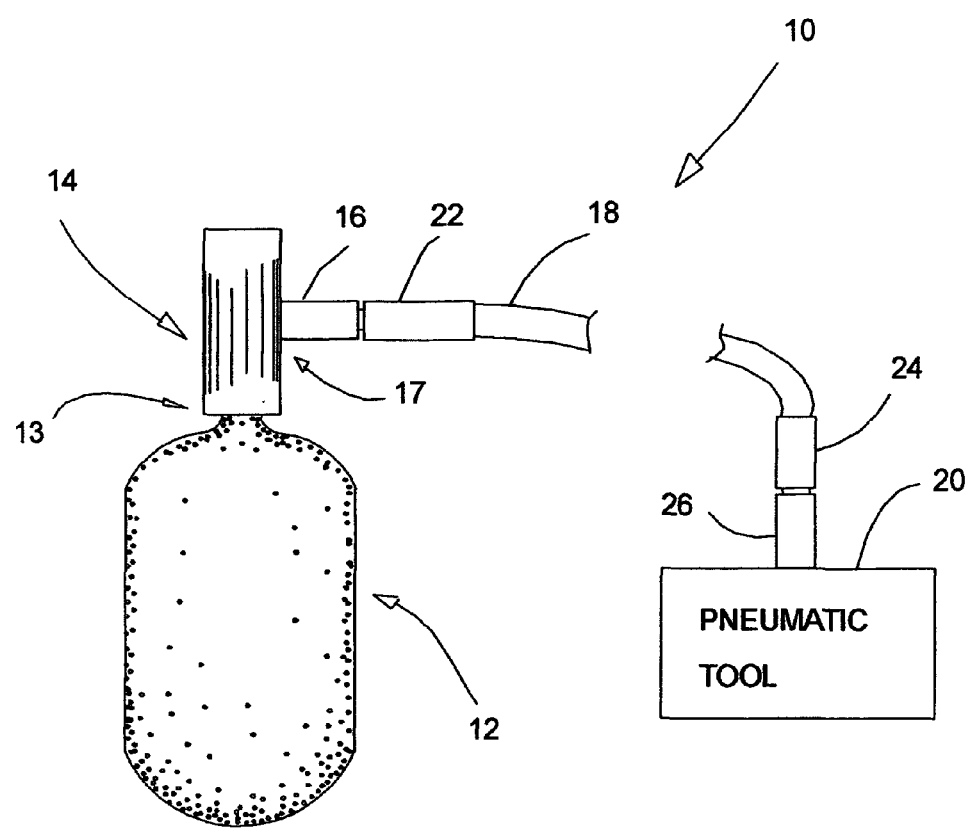
FIG. 1 is a perspective view of one embodiment of the present invention being a portable gas operated construction tool.

Turning to the drawings, wherein like components are designated by like reference numerals throughout the various figures, attention is initially directed to FIG. 1 which illustrates by schematic view a portal compressed gas operated tool system 10 constructed according to the present invention.

As best shown in FIG. 1, a portable bottle 12 of compressed gas provides the source of power to a conventional gas powered tool 20. This bottle 12 may be of conventional design and contains pressurized carbon dioxide or other appropriate gases at a pressure of about 150 kg/cm$^2$ and have a weight of about 2 pounds. The top of the bottle 12 has a threaded outlet 13 with a pressure on/off valve of the Schrader type or the like. A compensating pressure regulator 14 is shown attached to the outlet 13. The regulator 14 weights about 6 ounces or less and has a diameter of about 1 inch with a length of about 3 inches. It is normally constructed of metal such as aluminum or steel due to the high pressures involved. An outlet 17 is provided on the side of the regulator 14 into which a female threaded pressure fitting 16 of conventional design is attached. The pressure fitting 16 has a quick connection so that a conventional air hose 18 can be readily attached thereto by means of a fitting 22 at one end of the hose. The other end of the air hose 18 would have a normally off valve female pressure fitting 24 thereon which is pushed onto the male pressure fitting 26 of the tool 20. All pressure fittings and hoses are of conventional design and are commercially available. When the compressed gas is expended, the bottle 12 is unscrewed and replaced with a newly charged bottle.

Figure 2:
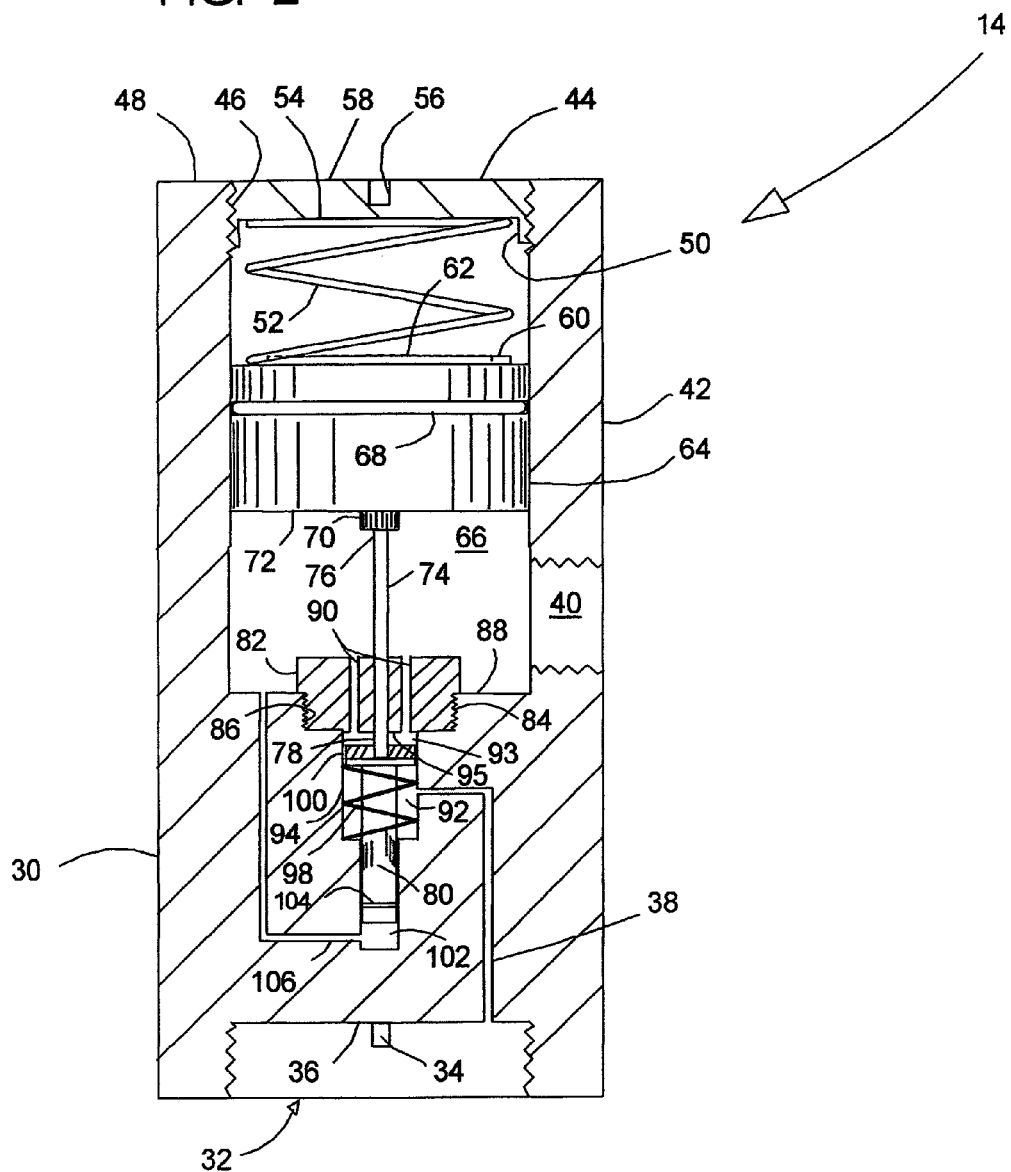
FIG. 2 is a cross-sectional side view of the compensating pressure regulator in an equilibrium state.

Referring to FIG. 2, a cross sectional view of the compensating pressure regulator 14 is shown. It should be understood that the sizes, shapes, and placement of the various items are not limited, and merely shown to provide a picture of the general features of the present invention. References to "air" are understood to include fluids whether liquid or gas. Although threaded members are shown, other types of connections are feasible.

As seen in FIG. 2, the pressure regulator 14 has a body 30 with a threaded inlet 32 for accepting the bottle 12. A pressure valve-actuating member 34 is located centrally in the inlet 32 on a top wall 36 of the inlet 32. An inlet gas channel 38 is positioned also on the top wall 36. A threaded outlet 40 is provided in the side 42 of the regulator 14. Appropriate pressure fittings may be attached thereto. An adjustable cap member 44 is threaded into a threaded aperture 46 located at a top 48 of the regulator 14. A slot 56 for adjustment of the cap member 44 is located on a top surface 58 of the cap member 44. Although a slot for a screwdriver is shown, other types of structures may be placed thereon for use by machine or hand. A pressure relief vent, not shown, is also located in the cap member 44 to prevent over pressures beyond the design limit of the regulator 14. The cap member 14 has a bottom recess 50 onto which a top 54 of a piston spring 52 is positioned. A bottom 60 of the piston spring 52 fits over a raised section 62, shown in outline, of an upper piston 64 that is positioned in a pressure output chamber 66. The upper piston 64 has a pressure o-ring 68 positioned thereabout to prevent the flow of gas about the upper piston 64 from the pressure output chamber 66. A pin or rod-like holding device 70 is also located on a bottom 72 of the upper piston 64.

A pin or rod 74 has an upper end 76 that is located in the pin holding device 70. A lower end 78 of the pin 74 is connected to a lower piston 80. The pin 74 slideably passes through an orifice structure 82. The orifice structure 82 has a lower threaded section 84 that threads into an aperture 86 located in a bottom 88 of the pressure output chamber 66. The orifice structure 82 has a plurality of gas orifices 90 that allow the gas to flow to the pressure output chamber 66 from an upper pressure chamber 92. The upper pressure chamber 92 has a spring holding section 94 that has the lower piston 80 passing therethrough. A lower spring 98 positioned in the upper pressure chamber 92/spring holding section 94 biases the lower piston 80 toward the pressure output chamber 66. A gasket 100 is positioned on the top of the lower piston 80. The lower piston 80 passes into a lower pressure chamber 102 and also has a pressure o-ring 104 positioned about the lower piston 80. It should be understood that the o-ring 104 separates the lower pressure chamber 102 from the upper pressure chamber 92. The inlet gas channel 38 inputs into the upper pressure chamber 92. A compensating channel 106 is connected between the lower pressure chamber 102 and the pressure output chamber 66. There is further no air seal between the lower piston 80 and the gasket 100 so that air flows past the gasket 100 into the chamber 93 above the gasket 100. The volume of the chamber 93 determines the actual output pressure. If the adjustable cap member 44 is "unscrewed," eventually, the gasket 100 will come into contact with a bottom 95 of the orifice structure 82 and thus prevent the flow of any gas through the orifices 90. If the cap member 44 is "screwed" into the body a maximum amount, the volume of chamber 93 will increase and will allow the maximum air pressure output.

In normal operations where the gas pressure is stable, as gas flows into the inlet 32 from the attached bottle 12, it enters the inlet gas channel 38. It flows into the upper pressure chamber 92 of the lower piston 80 and then into the pressure output chamber 66. It further flows into the compensating channel 106 to the lower pressure chamber 102. The pressures upon the o-ring 104 will balance.

Considering a large input pressure spike from the attached container 12, the higher pressure coming into the upper pressure chamber 92 will cause the lower piston 80 to move downwardly as seen in FIG. 2. The lower piston 80 dampening out spikes by quickly responding to pressure changes with the aid of seal 104. Due to the larger mass of the upper piston 64 and the larger spring 52, it will not respond as quickly as the lower piston 80 with spring 98. The higher pressure will be transmitted through output chamber 66 enter into the compensating channel 106 to force the lower piston 80 upwards and further force the upper piston 64 upwards via the force from the pin 74 and thus decrease the pressure from the spike by increasing the volume of the pressure output chamber 66. Thus, the spike in high gas pressure is compensated with the gas spike traveling through the compensating channel/path 106 thereby alleviating the pressure spike and returning the output gas pressure in chamber 66 to a preset state.

Considering a lower pressure spike, the lower pressure in the upper pressure chamber 92 will cause the lower piston 80 to move upwards and draws into the lower pressure chamber 102 gas from the pressure output chamber 66. Further, the lower gas pressure will "tend" to cause the upper piston 64 to move downwards due to the discrepancy of spring forces between 52 and 98. This differential will aid in decreasing the volume in the pressure output chamber 66. The lower pressure spike will thus flow into the compensating channel 106 to causing the lower piston 80 to move downward down and to return to a stable condition as before the lower pressure spike.

Figure 3:
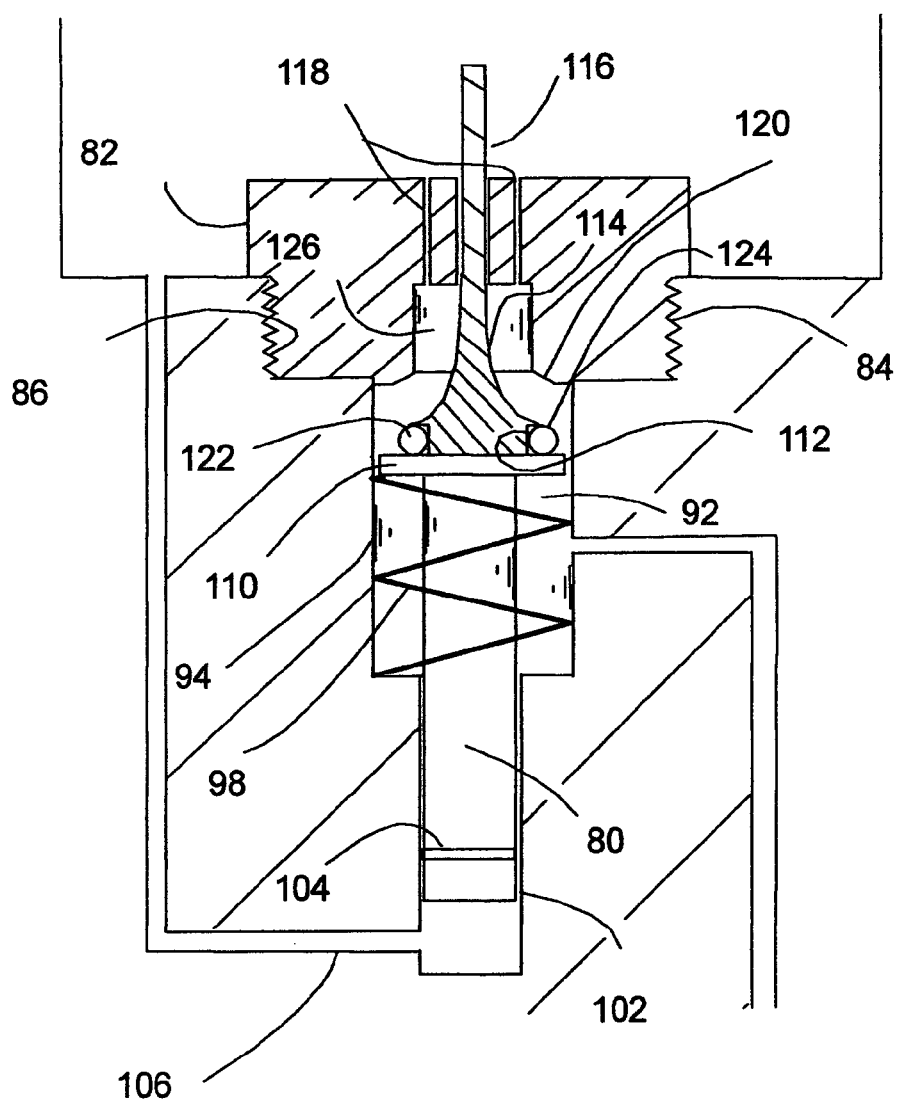
FIG. 3 is an enlarged cross sectional view of a compensating device showing another embodiment of FIG. 2.

FIG. 3 illustrates a cross sectional view of another embodiment of the compensating device. As seen therein, the gasket 100 of FIG. 2 is replaced by an o-ring 122 in FIG. 3. A flange 110 is positioned at the top of the lower piston 80 and is integrally formed. A tapered pin section 114 merges with the flange 110. An o-ring channel 112 is positioned about the lower part of the tapered pin section 114 so that the o-ring 122 is positioned therein. An upper edge 124 of the o-ring 122 will come into contact with an o-ring seat 120 formed about the bottom of the orifice structure 82. An enlarged channel 126 has the orifices 118 positioned at the top thereof as well as a bore for slideably holding the pin 116. When the o-ring 122 is pushed against the o-ring seat 120, no air is allowed to flow past the flange 110 into the enlarged channel 126 and through the orifices 90 into the pressure output chamber 66.

High or lower pressure spikes coming from the operating tool will be mitigated also by the compensating pressure regulator 14. The higher pressure will cause the upper piston 64 to move upwards and the lower piston 80 to move upwards and thus lowering the resulting pressure in the pressure output chamber 66. A lower pressure spike will cause the larger piston 64 to move downwards thus decreasing the available volume in the pressure output chamber thus equalizing any pressure variations whether high or low coming from the operating source or the compressed gas source.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A compensating pressure regulator, said compensating pressure regulator comprising:
   a single stage regulating device for controlling the flow of compressed gas therethrough; and
   a compensating device for automatically substantially eliminate spike pressure conditions to provide a substantially uniform gas pressure output from said single stage regulating device, said compensating pressure regulator further including a pin, said pin having a top end in affixed contact with an upper piston of said single stage regulating device, said top end in affixed contact with said upper piston having no relative motion with respect to said upper piston, said compensating pressure regulator having said pin with a lower end in affixed contact with a lower piston, said lower piston biased towards the upper piston and located in said compensating device, said lower piston having an upper pressure chamber thereabove, said compensating device further including an orifice structure, said orifice structure in fluid communication with a pressure output chamber having said upper piston therein of said single stage regulating device and a said upper pressure chamber being located below said orifice structure and above said lower piston of said compensating device, said pin slideably located therein; wherein said orifice structure comprises a center passage for supporting the pin and a plurality of flow orifices surrounding the center passage; and wherein a valve outlet is located directly connected to the pressure outlet chamber and above the upper pressure chamber, and a compensating channel extends from the pressure outlet channel to a lower pressure chamber below the lower piston and is separate from the valve outlet.

2. The compensating pressure regulator as defined in claim 1, wherein said compensating pressure regulator has said lower piston of said compensating device being located in a chamber having said upper pressure chamber and said lower pressure chamber therein, said lower piston having a sealing device being a pressure O-ring to prevent the flow of gas from said upper pressure chamber to said lower pressure chamber, an unbalance pressure upon said pressure O-ring further moves said lower piston in the direction of lower pressure.

3. The compensating pressure regulator as defined in claim 1, said compensating pressure regulator further including a gasket locating on a top of said lower piston for preventing the flow of gas through said orifice structure when in contact therewith.

* * * * *